United States Patent
Budd et al.

(10) Patent No.: US 7,421,160 B1
(45) Date of Patent: Sep. 2, 2008

(54) COUPLING ELEMENT ALIGNMENT USING WAVEGUIDE FIDUCIALS

(75) Inventors: Russell A. Budd, North Salem, NY (US); Punit Chiniwalla, Ann Arbor, MI (US); Philip C. D. Hobbs, Briarcliff Manor, NY (US); Frank R. Libsch, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/733,406

(22) Filed: Apr. 10, 2007

(51) Int. Cl.
*G02B 6/32* (2006.01)
*G02B 6/26* (2006.01)
*G02B 6/42* (2006.01)
*G02B 6/10* (2006.01)

(52) U.S. Cl. ............................ 385/33; 385/31; 385/39; 385/50; 385/129; 385/130; 385/132

(58) Field of Classification Search .................... 385/33
See application file for complete search history.

(56) References Cited

U.S. PATENT DOCUMENTS

| | | | |
|---|---|---|---|
| 5,898,803 A * | 4/1999 | Mueller-Fiedler et al. ...... | 385/36 |
| 6,236,788 B1 * | 5/2001 | Moisel .......................... | 385/52 |
| 6,754,407 B2 | 6/2004 | Chakravorty et al. | |
| 6,934,429 B2 * | 8/2005 | Kikuchi et al. ................ | 385/14 |
| 6,973,248 B2 * | 12/2005 | Kropp ......................... | 385/131 |
| 7,212,698 B2 * | 5/2007 | Bapst et al. .................... | 385/14 |
| 2005/0117833 A1 * | 6/2005 | Fukuzawa et al. ............. | 385/14 |
| 2005/0176161 A1 * | 8/2005 | Bapst et al. .................... | 438/31 |
| 2006/0263003 A1 * | 11/2006 | Asai et al. ..................... | 385/14 |

OTHER PUBLICATIONS

Schnitzer et al , "High performance VCSEL ararys for optical interconnection " Electronic Components and Technology Conference, pp. 762-770 (May 1998).

* cited by examiner

*Primary Examiner*—Frank G Font
*Assistant Examiner*—Ryan Lepisto
(74) *Attorney, Agent, or Firm*—Ryan, Mason & Lewis, LLP; Daniel P. Morris, Esq.

(57) ABSTRACT

An optical assembly includes a waveguide assembly and an optical coupling element. The waveguide assembly includes a core, a cladding portion, and, preferably, at least two waveguide core fiducials, the at least two waveguide core fiducials and the core being lithographically formed substantially simultaneously in a substantially coplanar layer. The core and the at least two waveguide core fiducials are formed in a predetermined relationship with the cladding portion. The optical coupling element (for example, a lens array or mechanical transfer (MT) ferrule), includes an optical element and, preferably, at least two alignment features associated with the optical element, the at least two alignment features being mated with the at least two waveguide core fiducials to accurately position the optical element with respect to the core in an X-Y plane. A method of alignment is also provided.

14 Claims, 6 Drawing Sheets

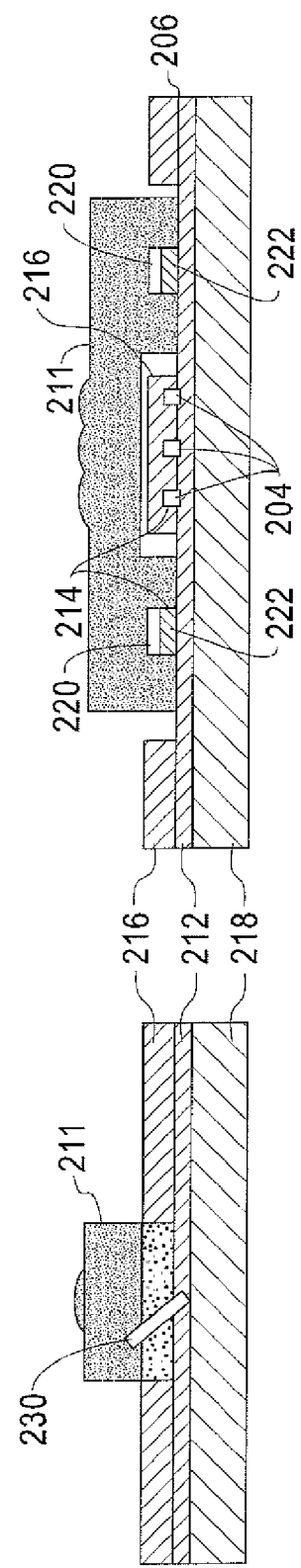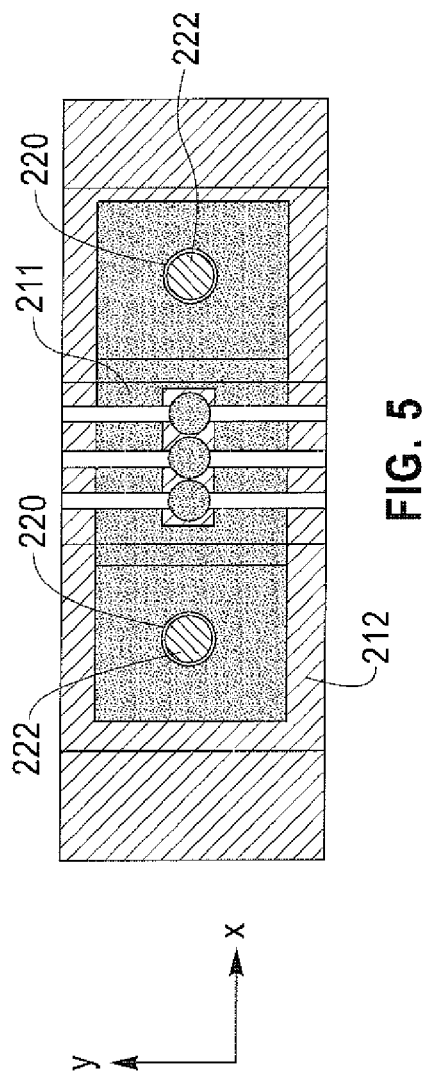

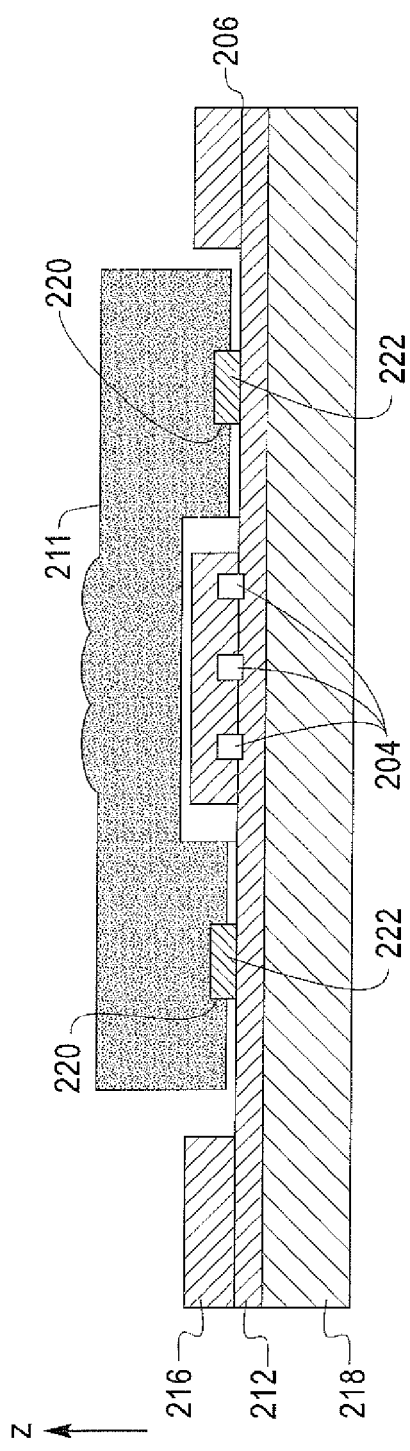
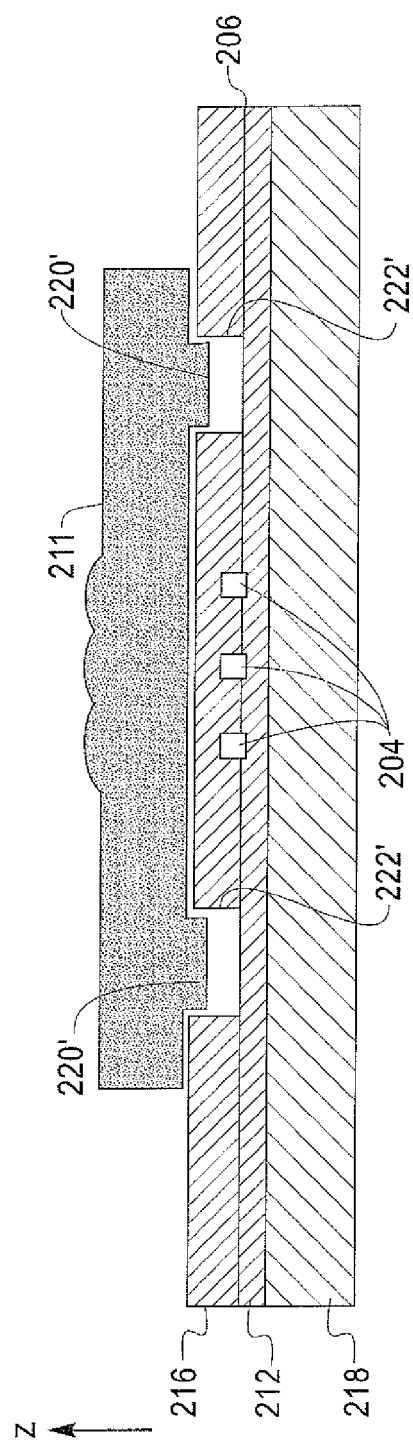
FIG. 6
FIG. 7

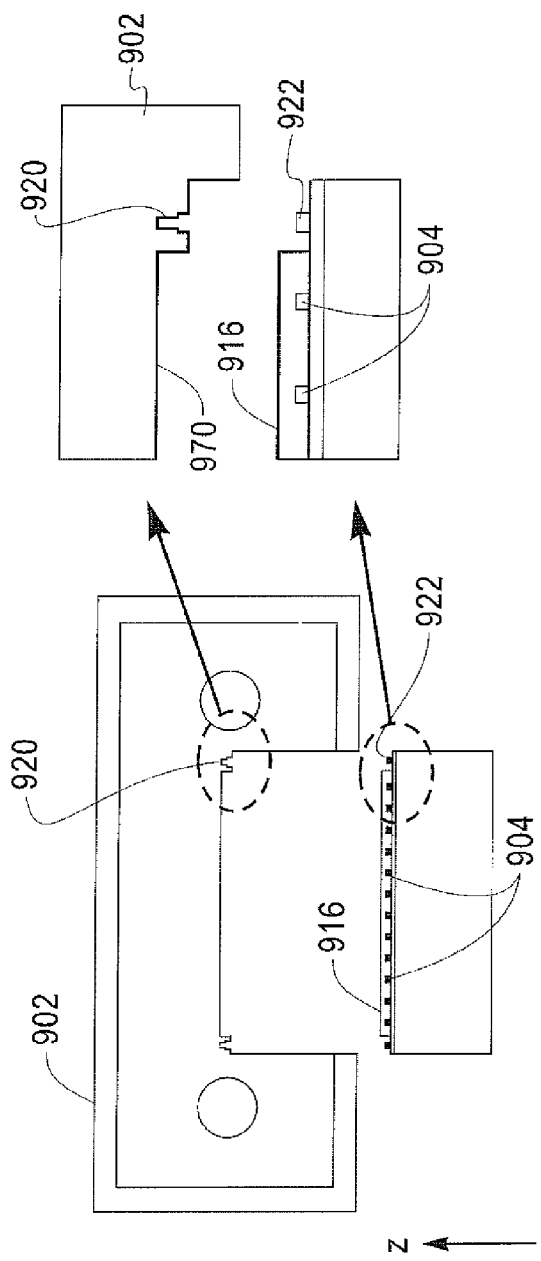
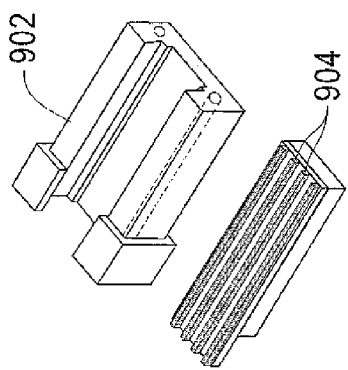
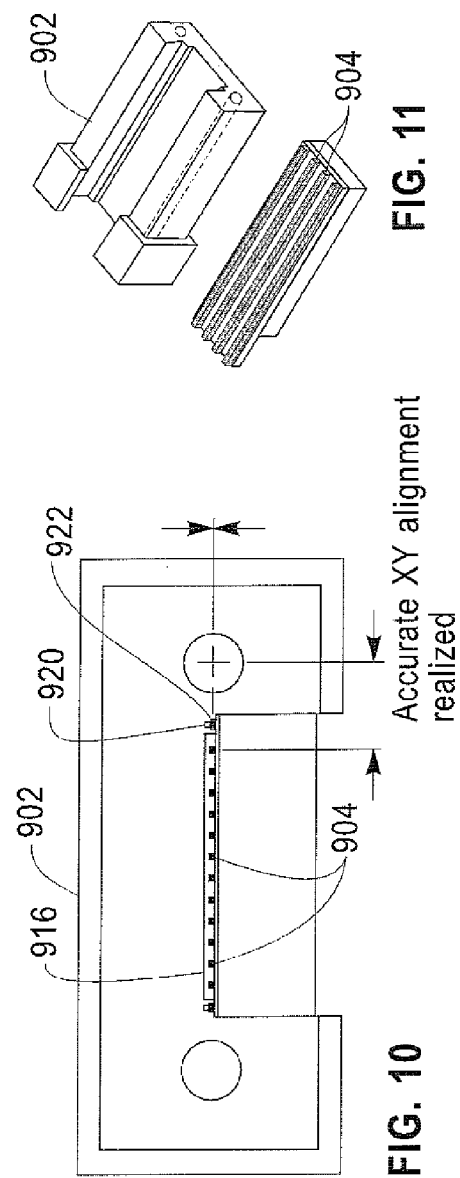
FIG. 9
FIG. 11
FIG. 10

COUPLING ELEMENT ALIGNMENT USING WAVEGUIDE FIDUCIALS

FIELD OF THE INVENTION

The present invention generally relates to the electrical, electronic, and optical arts and, more particularly, to techniques for aligning optical coupling elements to waveguide cores.

BACKGROUND OF THE INVENTION

The reliable, accurate and cost-effective integration of optical coupling elements and optical connectors with waveguides structures is a challenge. The performance of high-end computer systems continues to be limited less by microprocessor clock speeds and mole by the interconnections between microprocessors. As data rates increase, traditional copper links are limited to shorter distances, especially in the face of power constraints and high aggregate bandwidths. For board-to-board and rack-to-rack interconnects, the edge connector density is starting to limit the overall throughput. The incorporation of highly-parallel optical data links into these systems could offer superior performance in terms of density, power dissipation and cost.

Parallel optical modules include arrays of silicon circuitry connected to optoelectronic (OE) devices implemented using III-V semiconductors. These modules may be positioned in close proximity to a printed circuit board that may contain one or more optical waveguide channels. The light can be coupled into the waveguides, and then easily routed across the circuit board to other optical modules. The waveguides may be on the top of the board or embedded within the board. This embedded waveguide arrangement, shown in FIG. 1, is similar to the one described in Khakravorty et al., "Flip-Chip Package Integrating Optical and Electrical Devices and Coupling to a Waveguide on a Board," U.S. Patent Application Publication 2003/0002770A1, Jan. 2, 2003.

In the past, the alignment between the OE devices (or lens arrays) and the waveguide cores were realized by actively aligning the OE or coupling elements through the use of sophisticated tooling; powering up the OE devices, and monitoring the light coupled into the waveguide core. This process was time consuming and costly.

Referring now to FIG. 1, there is depicted therein a cross-sectional view of the optical coupling between an OE module 102 and the core layer 116 of a polymer waveguide film, according to the prior art. In this case, an OE device array 106 is supported on a carrier substrate 108 that also contains a collimating lens array element 110. This assembly, also known as the OF module, is attached to the PCB substrate 112 by a solder ball grid array (BGA), pin grid array, land grid allay, or other techniques, all of which are suggested by ball elements 114. Light from the OE module 102 is gathered by the waveguide lens array coupling element 115 and focused into the core 116 of an optical waveguide 118 formed by core 116 and cladding 104. Depending upon the size of the waveguide core 116, the waveguide lens array 115 must be centered with respect to the cote 116 to within 5 to 10 microns. In this case an alignment hole 120 (precisely aligned to the waveguide core 116) was fabricated in a copper layer 122 adjacent to the waveguide layer 118. The process to fabricate this alignment hole 120 requites precise and accurately tooling leading to increased process complexity and cost. Next, the waveguide lens array 115 with its corresponding alignment pin 124 is placed on top of the waveguide layer 118 and its alignment pin 124 inserted into the alignment hole 120. Thus, precise alignment of the waveguide lens array assembly 115 is realized, however, fabrication of the waveguide reference hole 120 required substantial time and expense.

Accordingly, it would be desirable to overcome the limitations of prior art approaches.

SUMMARY OF THE INVENTION

Principles of the present invention provide techniques for aligning optical coupling elements to waveguide cores. An exemplary embodiment of an optical assembly, according to one aspect of the invention, includes a waveguide assembly and an optical coupling element. The waveguide assembly includes a core, a cladding portion, and (preferably) at least two waveguide core fiducials, the at least two waveguide core fiducials and the core being lithographically formed substantially simultaneously in a substantially coplanar layer. The core and the at least two waveguide core fiducials are formed in a predetermined relationship with the cladding portion. The optical coupling element (for example, a lens array or mechanical transfer (MT) ferrule), includes an optical element and at least two alignment features associated with the optical element, the at least two alignment features being mated with the at least two waveguide core fiducials to accurately position the optical element with respect to the core in an X-Y plane. In some instances, a single fiducial and a single alignment feature can be employed.

In another aspect, an exemplary method for aligning an optical coupling element to a waveguide core, according to another aspect of the invention, includes the step of providing a waveguide assembly, the waveguide assembly comprising a core, a cladding portion, and (preferably) at least two waveguide core fiducials lithographically formed substantially simultaneously with the core. The core and the at least two waveguide core fiducials are formed in a predetermined relationship with the cladding portion. The method also includes the step of providing an optical coupling element (for example, a lens array or MT ferrule), the optical coupling element including an optical element and at least two alignment features associated with the optical element. The at least two alignment features are configured to mate with the at least two waveguide core fiducials and to accurately position the optical element with respect to the core in an X-Y plane. The method further includes the step of plugging the at least two waveguide core fiducials and the at least two alignment features together, whereby the waveguide core and the optical coupling element are accurately positioned in the X-Y plane. Again, in some instances, a single fiducial and a single alignment feature can be employed.

One or more embodiments provide a practical, accurate, and low cost technique and structure to align optoelectronic (OE) devices, lens arrays, and other connector elements to polymer waveguide optical interconnect materials. One or mole exemplary embodiments utilize lithographic features that are patterned at the same time as the waveguide core to very accurately establish mechanical alignment fiducials. By using these fiducials during the assembly of the waveguide's connector elements, an extremely accurate assembly is realized in a passive manner.

These and other objects, features and advantages of the present invention will become apparent from the following detailed description of illustrative embodiments thereof which is to be read in connection with the accompanying drawings.

BRIEF DESCRIPTION OF THE DRAWING

FIGS. 3-5 are, respectively, side, front, and top view illustrations showing the passive alignment of a microlens array assembly to a polymer waveguide layer, according to one example of the invention;

FIGS. 6-8 show alternate exemplary approached for referencing the microlens assembly to the waveguide layer; and FIGS. 9-11 show the passive alignment of a connector element to the waveguide layer, according to one example of the invention.

DETAILED DESCRIPTION OF PREFERRED EMBODIMENTS

Figure 1:
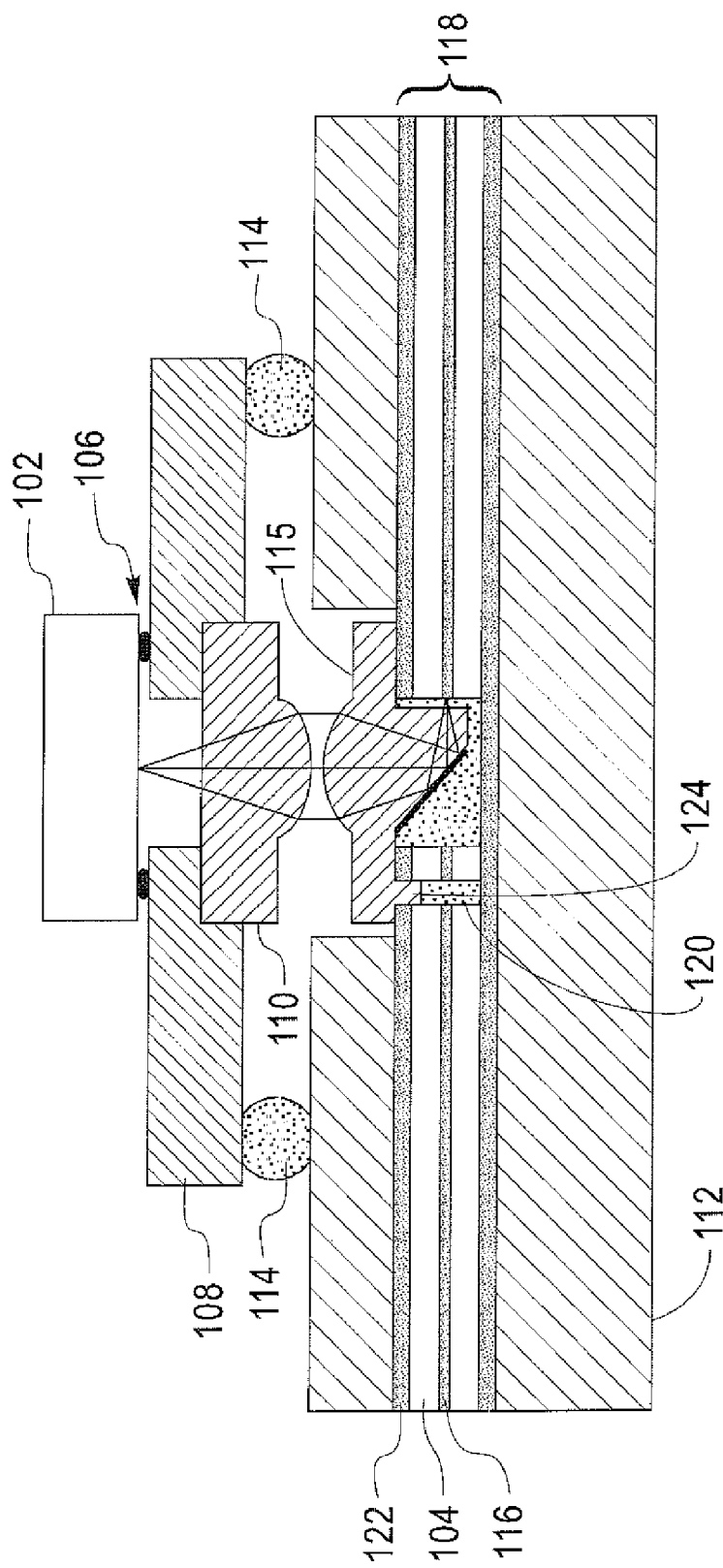
FIG. 1 is an illustration of the optical coupling between an OE module and waveguides embedded in a printed circuit board, according to prior-art techniques.
Figure 2:
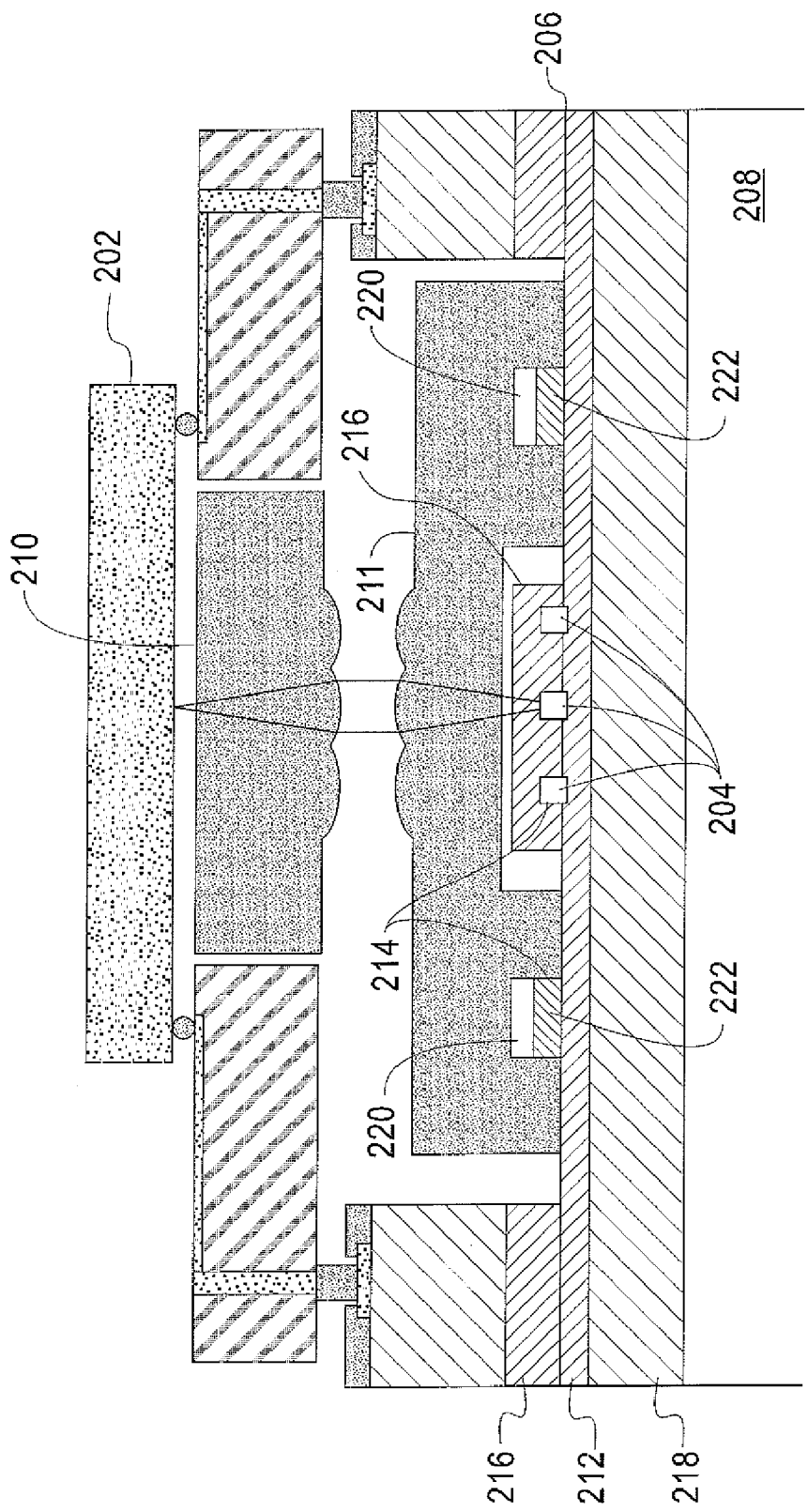
FIG. 2 is a side view illustration, showing the passive alignment of a microlens array assembly to a polymer waveguide layer, according to one example of the invention.

Exemplary apparatuses and methods will now be described with respect to the figures, in which like reference characters are used throughout to refer to like elements, unless otherwise noted. With reference to FIG. 2, such figure shows a cross-sectional view of the inventive optical coupling between an OE module 202 and the core layer 204 of a polymer waveguide film 206 embedded in a printed circuit board 208, according to an exemplary embodiment of the invention. The orientation of the waveguide film 204 has been rotated such that the light path within the waveguide core is viewed "end-on" in the figure; additionally the waveguide light turning mirror is not shown for clarity reasons. As in FIG. 1, the light from the OF module 202 (including lenses 210) is gathered by the waveguide lens array assembly 211 and focused into the individual waveguide cores 204. Once again, the waveguide lens array assembly 211 must be aligned with respect to the waveguide cores 204 to a given degree of precision, typically 5 microns, depending upon several factors such as core size, waveguide numerical aperture (NA), Vertical-Cavity Surface-Emitting Laser (VCSEL) source size, etc. The waveguide film is typically formed of several layers, such as a lower cladding layer 212 (acting as a base), a core layer 214 (to carry the signal light), and sealed by a top cladding layer 216. The index contrast between the core 214 and the cladding 216 enables the light to be confined within the core by means of total internal reflection (as set forth below, layer 214 includes both cores 204 and fiducials 222 to be discussed). The fabrication of the waveguide film stack typically begins with the deposition of the lower clad layer 212 on a base substrate 218. This lower clad layer 212 helps to planarize the substrate 218 and provide a smooth base for the cote layer 214. Next the core layer 214 is applied. The core material may be applied to the lower clad layer 212 by either splay coating or doctor blading. Next the core material 214 is patterned. Typically the core layer is exposed to UV light through a proximity photomask or by optical projection techniques, thus defining the waveguide core pattern with cores 204 and fiducials 222. Next, unexposed regions on the core layer are removed by means of a developer. Finally a top clad layer 216 is applied to seal the photo-defined cores 204.

In one or more embodiments of the invention, additional features are defined in the core layer 214 at the same time that the light carrying cores 204 are defined. These additional features may be used to provide an accurate positional reference for the subsequent attachment of waveguide coupling elements, such as a waveguide lens allay coupling element 211. As shown in FIG. 2, these additional core features, also referred to as waveguide core fiducials 222, may be positioned adjacent to the waveguide core (light signal carrying) region 204. These fiducials 222 may be of varied size and shape. Since they are defined at the same time as the waveguide cores, the positional accuracy between the cores 204 and the core fiducials 222 is defined by the accuracy of the lithographic process, typically much better than 1 micron. After development and curing of the waveguide core layer, a top clad layer 216 is applied (by means of doctor blading or splay coating) on top of the film stack. This top clad layer may also be photo-patterned; in this case the top clad material is removed in the region above the waveguide core fiducials 222. This material is removed so that the mating coupling elements (in this example, recesses 220 of lens 211) may directly access the waveguide core fiducials 222. At this point, the waveguide film stack is complete.

Next, as shown in FIG. 2, a waveguide lens array assembly 211 is attached to the waveguide film layer 206. The waveguide lens array assembly incorporates its own mating fiducials 220 with mate with corresponding fiducials 222 on the waveguide stack. The waveguide lens array assembly 211 may be fabricated by precision injection molding of optically transparent polymer, or other techniques, leading to a highly accurate and low cost assembly. The placement of the lens array assembly 211 to the waveguide layer 206 is done in a simple manner without the need to actively align these parts by hand or other mechanical means. An adhesive may be used to hold the lens assembly in place 211. Hence the coupling element (waveguide lens array 211) may be accurately positioned (or plugged in) in a low cost manner compared to previous methods.

Note that the exemplary embodiments discussed herein refer to at least two waveguide core fiducials and at least two corresponding mating fiducials or alignment features. This approach is preferred, and optimally, there should be (at least) one fiducial on each side of the waveguide core(s). However, in some instances, one waveguide fiducial of appropriate shape, such as a rectangular shape, can be employed (with a single corresponding mating fiducial or alignment feature). The single fiducial can be positioned on one side of the waveguide cores, and should have a non-circular shape, so that it can determine location (including angular orientation) in the X-Y plane by itself. However, this single-fiducial approach is currently believed to be less preferred.

FIGS. 3-5 show the side, front, and top view of this improved coupling element alignment method of FIG. 2. Note turning mirror 230. For the case shown in FIG. 5, two waveguide core fiducials 222 are positioned adjacent to the waveguide core region. The waveguide fiducials 222 are, in this example, circular features. The waveguide lens array assembly contains two corresponding fiducial 220 that mate to the waveguide core fiducials 222. For the case shown, the waveguide lens array assembly 211 tests on the waveguide lower clad 212; this defines the Z position of the assembly. The X and Y position of the waveguide lens arrays assembly is precisely defined by the waveguide core fiducials 222. It is understood that the core fiducial shape may be other than circular, for example square, rectangular, elliptical, triangular or any other shape. It is also understood that the one or more core fiducials 222 may be used at any other position(s) relative to the light carrying core region.

Figure 8:
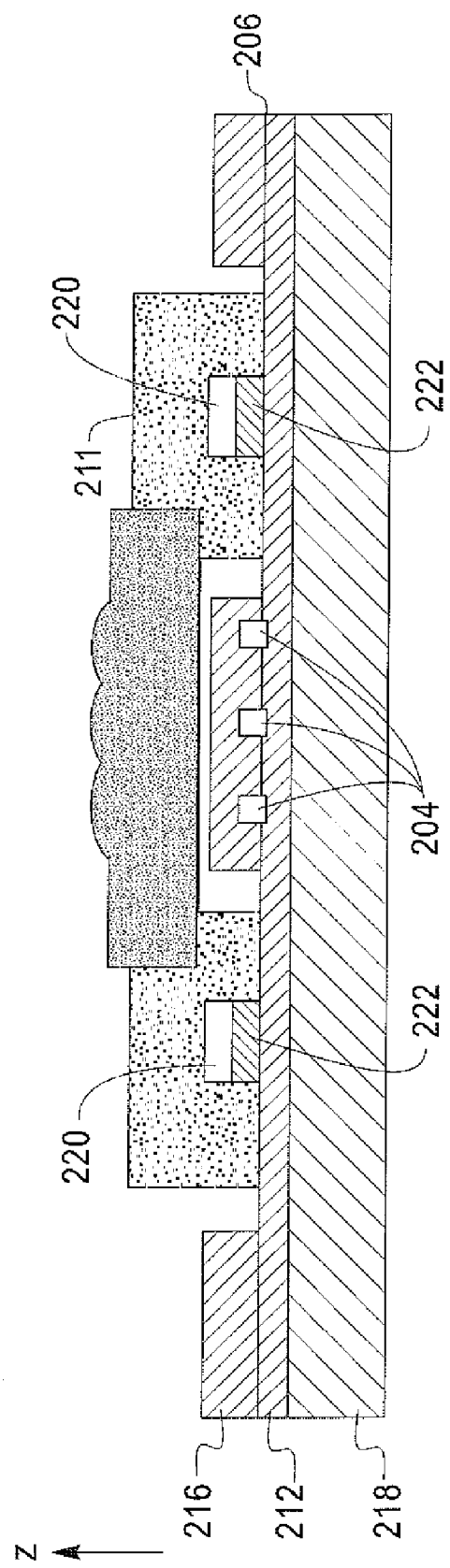

FIGS. 6-8 show alternate Z reference techniques. For the case in FIG. 6, the coupling element Z position is defined by the tops of the waveguide core fiducials 222. For the case is FIG. 7, the coupling element Z position is defined by the top of the top cladding 216. Note that in FIG. 7, fiducials 222' in the layer of waveguide cores 204 are female, and the corresponding alignment features 220' in lens 211 are male. For the case in FIG. 8, the coupling element Z position is defined by the top of the bottom cladding 212

FIGS. 9-11 show the alignment of an MT ferrule 902 to the waveguide film with waveguides 904 FIG. 9 shows an end view of a modified MT ferrule 902 and of the waveguide film with waveguides 904. Here, once again, waveguide core alignment fiducials 922 are formed adjacent to the waveguide core coupling region. A corresponding MT ferrule alignment feature 920 is formed to mate with the waveguide feature. As shown, the top of the waveguide cladding 916 may act as the Z position reference when mated with the MT ferrule assembly 902. The modified MT ferrule may be fabricated by several techniques, one possible method being precision injection molding. In this case, a high degree of accuracy may be realized between the MT ferrule alignment holes 920 and the MT ferrule to waveguide alignment features 922. FIG. 10 shows the final assembly of the MT ferrule 902 and the waveguide film with cores 904. After assembly and bonding, the end of the MT ferrule assembly may be polished and sealed to ensure high optical coupling efficiency from the MT ferrule to a mating assembly. One appreciates that a high degree of alignment accuracy is realized between the MT ferrule alignment holes 920 and the waveguide cores FIG. 11 is a pictorial view.

An inventive method of aligning an optical coupling element to a waveguide core thus includes the step of providing a waveguide assembly, the waveguide assembly comprising a core 204, 904, a cladding portion (such as 216, 916), and at least two waveguide core fiducials 222, 222', 922 lithographically formed substantially simultaneously with the core 204, 904, the core and the at least two waveguide core fiducials being formed in a predetermined relationship with the cladding portion. The method also includes the step of providing an optical coupling element, the optical coupling element comprising an optical element (for example, 211, 902) and at least two alignment features 220, 220', 920 associated with the optical element, the at least two alignment features being configured to mate with the at least two waveguide core fiducials and to accurately position the optical element with respect to the core in an X-Y plane. The method further includes the step of plugging the at least two waveguide core fiducials 222, 222', 922 and the at least two alignment features 220, 220', 920 together, whereby the waveguide core 204, 904 and the optical coupling element 202, 902 are accurately positioned in the X-Y plane.

The core fiducials and the alignment features can, in some instances, be substantially round in cross-section. In other instances, one or more can have other shapes; for example, at least one of the core fiducials and at least a corresponding one of the alignment features might not be substantially round in cross-section; one or more could have other shapes or could have flats on them, or the like.

As shown in FIGS. 2-8, the optical coupling element could be a lens array formed by element 211 with fiducials 220. As shown in FIGS. 6-8, the method could include the additional step of locating the lens array with respect to the waveguide assembly in a Z-direction, for example, resting the lens array 211 on a top surface of the fiducials 204, as in FIG. 6; testing the lens array 211 on a top clad layer 216 of the waveguide assembly, as in FIG. 7, or resting the lens assembly 211 on a bottom clad layer 212 of the waveguide assembly.

As shown in FIGS. 9-11, the optical coupling element could be a mechanical transfer (MT) ferrule 902 with alignment features 920. As best seen in FIG. 9, in such case, the method could include the additional step of locating the MT ferrule 902 with respect to the waveguide assembly (including cores 904) in a Z-direction. In one non-limiting example, the locating step includes resting a substantially planar surface 970 of the MT ferrule 902 on a top surface of the waveguide cladding portion 916

As discussed herein, for example, with respect to FIG. 2, the step of providing the waveguide assembly can include providing a substrate 212, 218; depositing a waveguide layer 214 on the substrate; and lithographically forming the core(s) 204 and the at least two waveguide core fiducials 222 from the waveguide layer. In one or more embodiments, the cladding portion includes a bottom clad layer 212 and a top clad layer 216; the substrate comprises a base substrate 218 and the bottom clad layer 212; and the step of providing the waveguide assembly further includes applying the top clad layer 216 over the core(s) 204 and the at least two waveguide fiducials 222, and removing material from the top clad layer adjacent the at least two waveguide fiducials.

An inventive optical assembly can include, by way of example and not limitation, a waveguide assembly, the waveguide assembly in turn comprising a core 204, 904, a cladding portion (such as 216, 916), and at least two waveguide core fiducials 222, 222', 922, the at least two waveguide core fiducials and the core being lithographically formed substantially simultaneously in a substantially coplanar layer, the core and the at least two waveguide core fiducials being formed in a predetermined relationship with the cladding portion. Also included is an optical coupling element, the optical coupling element in turn comprising an optical element 202, 902 and at least two alignment features 220, 220', 920 associated with the optical element, the at least two alignment features being mated with the at least two waveguide core fiducials to accurately position the optical element with respect to the core in an X-Y plane.

As previously discussed, the optical coupling element could include, for example, a lens array or an MT ferrule—these examples are not meant to be limiting. As discussed with regard to FIGS. 6-8, the optical assembly can include a waveguide assembly Z-determining surface on the waveguide assembly and an optical coupling element Z-determining surface on the optical coupling element. The Z-determining surfaces are in substantial engagement to position the waveguide assembly and the optical coupling element in a predetermined relationship to one another in a Z-direction. In FIG. 6, the waveguide assembly Z-determining surface includes top surfaces of the at least two fiducials 222. In FIG. 7, the waveguide assembly Z-determining surface includes a top clad layer 216 of the waveguide assembly. In FIG. 8, the waveguide assembly Z-determining surface includes a bottom clad layer 212 of the waveguide assembly.

One or more embodiments of the present invention thus relate generally to integrated circuits, circuit packaging, circuit communication technologies, and particularly, but not by way of limitation, the mating of coupling elements to optical waveguide structures. One or more exemplary applications of inventive techniques accurately and cost effectively align these coupling elements in a passive manner using accurately defined waveguide fiducials, thus realizing a practical, accurate, and low cost means to align OE devices, lens arrays, and other connector elements to polymer waveguide optical interconnect materials and the like. In the past, for optical interconnect systems, the alignment between the OE devices (or lens arrays) and the waveguide core was realized by actively aligning OF or coupling elements through the use of sophisticated tooling, powering up the OE devices, and monitoring the light coupled into the waveguide core. This process was time consuming and costly. With one or more exemplary embodiments of the present invention, one is able to utilize lithographic features that are patterned at the same time as the waveguide core to very accurately establish mechanical alignment fiducials. By using these fiducials during the assembly of the waveguide's connector elements, an extremely accurate assembly is realized in a passive manner.

The techniques set forth herein can be used to make circuits realized on an integrated circuit chip. The chip design can be created, for example, in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design can then be converted into an appropriate format such as, for example, Graphic Design System II (GDSII), for the fabrication of photolithographic masks, which typically include multiple copies of the chip design in question that are to be formed on a wafer. The photolithographic masks can be utilized to define areas of the wafer (and/or the layers thereon) to be etched or otherwise processed.

Resulting integrated circuit chips can be distributed by the fabricator in raw wafer form (that is, as a single wafer that has multiple unpackaged chips), as a bare die or in a packaged form. In the latter case, the chip can be mounted in a single chip package (such as a plastic carrier, with leads that are affixed to a mother board or other higher level carrier) or in a multi-chip package (such as a ceramic carrier that has either or both surface interconnections or buried interconnections). In any case, the chip may then be integrated with other chips, discrete circuit elements and/or other signal processing devices as part of either (a) an intermediate product, such as a mother board, or (b) an end product. The end product can be any product that includes integrated circuit chips, ranging from toys and other low-end or consumer electronic applications to advanced computer products. The techniques set for the herein can be used for interconnecting the chip on chips or chip stacks for 3D applications, chips on wafers, chips on package or package on package.

It will be appreciated and should be understood that the exemplary embodiments of the invention described above can be implemented in a number of different fashions. Given the teachings of the invention provided herein, one of ordinary skill in the related art will be able to contemplate other implementations of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of aligning an optical coupling element to a waveguide core, said method comprising the steps of:
   providing a waveguide assembly, said waveguide assembly comprising a core, a cladding portion, and at least one waveguide core fiducial lithographically formed substantially simultaneously with said core, said core and said at least one waveguide core fiducial being formed in a predetermined relationship with said cladding portion;
   providing an optical coupling element, said optical coupling element comprising an optical element and at least one alignment feature associated with said optical element, said at least one alignment feature being configured to mate with said at least one waveguide core fiducial and to accurately position said optical element with respect to said core in an X-Y plane; and
   plugging said at least one waveguide core fiducial and said at least one alignment feature together, whereby said waveguide core and said optical coupling element are accurately positioned in said X-Y plane.

2. The method of claim 1, wherein said optical coupling element further comprises at least a second waveguide core fiducial and wherein said optical coupling element further comprises at least a second corresponding alignment feature, such that there are at least two waveguide core fiducials and at least two alignment features plugged together in said plugging step.

3. The method of claim 2, wherein said core fiducials and said alignment features are substantially round in cross-section.

4. The method of claim 2, wherein said optical coupling element comprises a lens array.

5. The method of claim 4, further comprising the additional step of locating said lens array with respect to said waveguide assembly in a Z-direction.

6. The method of claim 5, wherein said locating step comprises resting said lens array on a top surface of said first fiducial.

7. The method of claim 5, wherein said locating step comprises resting said lens array on a top clad layer of said waveguide assembly.

8. The method of claim 5, wherein said locating steps comprises resting said lens assembly on a bottom clad layer of said waveguide assembly.

9. The method of claim 2, wherein said optical coupling element comprises a mechanical transfer (MT) ferrule.

10. The method of claim 9, further comprising the additional step of locating said MT ferrule with respect to said waveguide assembly in a Z-direction.

11. The method of claim 10, wherein said locating step comprises resting a substantially planar surface of said MT ferrule on a top surface of said waveguide cladding portion.

12. The method of claim 2, wherein said step of providing said waveguide assembly comprises:
   providing a substrate;
   depositing a waveguide layer on said substrate; and
   lithographically forming said core and said at least two waveguide core fiducials from said waveguide layer.

13. The method of claim 12, wherein:
   said cladding portion comprises a bottom clad layer and a top clad layer;
   said substrate comprises a base substrate and said bottom clad layer;
   said step of providing said waveguide assembly further comprises applying said top clad layer over said core and said at least two waveguide fiducials and removing material from said top clad layer adjacent said at least two waveguide fiducials.

14. The method of claim 2, wherein at least one of said core fiducials and at least a corresponding one of said alignment features are not substantially round in cross-section.

* * * * *